United States Patent [19]
Herbert et al.

[11] Patent Number: 6,023,509
[45] Date of Patent: *Feb. 8, 2000

[54] DIGITAL SIGNATURE PURPOSE ENCODING

[75] Inventors: Howard C. Herbert; Derek L. Davis, both of Phoenix, Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/720,444

[22] Filed: Sep. 30, 1996

[51] Int. Cl.[7] .................................................. H04L 9/00
[52] U.S. Cl. ............................. 380/25; 380/23; 380/29; 380/30; 380/49
[58] Field of Search .............................. 380/4, 9, 23, 24, 380/25, 29, 30, 46, 49, 50, 59

[56] References Cited

U.S. PATENT DOCUMENTS

| | | |
|---|---|---|
| 5,005,200 | 4/1991 | Fischer ...................................... 380/30 |
| 5,208,858 | 5/1993 | Vollert et al. ......................... 380/23 X |
| 5,479,509 | 12/1995 | Ugon ......................................... 380/23 |

*Primary Examiner*—Bernarr E. Gregory
*Attorney, Agent, or Firm*—Blakely, Sokoloff, Taylor & Zafman

[57] ABSTRACT

A method and apparatus for encoding a purpose into a digital signature, where purpose and digital signature bound into an extended digital signature. The extended digital signature capability binds a purpose description identifying the purpose for the digital signature so that when affixed to a digital signature, the digital signature cannot be employed for improper purposes. A hash function is used to generate a hash value from the purpose description. The hash value is used in a digital signature function to bind the purpose to a digital signature. The extended digital signature can be verified for validity by comparing it to a hash value. In an electronic transaction, the extended digital signature can allow a purpose to be bound with the digital signature so that improper or unauthorized transactions are detected and disallowed.

14 Claims, 9 Drawing Sheets

DIGITAL SIGNATURE PURPOSE ENCODING

BACKGROUND OF THE INVENTION

1. Field of the Invention

The invention relates to the field of data security. More particularly, the invention relates to data security involving digital signatures transmitted with data.

2. Description of Related Art

The computer software market is exploding with a new breed of applications targeted towards electronic commerce transactions and digital content distribution across networks. Transactions performed across networks such as the Internet, especially electronic commerce transactions, must have enough security measures to ensure that theft and abuse are minimized. One such security measure widely employed to provide security for network transactions is public key cryptography.

In public key cryptography, two different keys, namely, a "public" key and a "private" key are used to encode messages. With knowledge of the public key, a user may encrypt a message, but without knowledge of the private key, another user cannot decrypt the same message. In a transaction, the originator of the message and the recipient agree on a particular public key cryptography system to use, such as the widely used Rivest, Shamir, and Adleman (RSA). Then the recipient sends the originator his public key with which the originator encrypts the message. Next, the encrypted message is sent over the network to the recipient who uses his private key to decrypt the message.

Another mechanism which is utilized in network transactions is the digital signature which authenticates or verifies that the message sent could have only originated from the signatory. A digital signature is formed by the originator by passing the data to be signed (e.g., a computer file or document) through a one-way hash function and then encrypting the resulting hash value using the private key of the originator. The originator then sends the data, the public key of the originator, and the digital signature to the recipient. The recipient passes the received data through the same one-way hash function obtaining a hash value. The recipient then decrypts the digital signature with the public key of the originator and recovers the hash value. If the recovered hash value matches the hash value the recipient generated, the signature is valid. Though this and other public key digital signature protocols guarantee a level of authenticity and security for the digital signature, these protocols do not have a mechanism for binding the purpose of a digital signature along with the signature so that the signature is not used for an improper purpose.

For many electronic commerce and digital content distribution applications, there is a requirement not only to generate and verify digital signatures, but also to control and enforce the purpose for which a digital signature was generated and verified. For instance, in an electronic commerce transaction, when a bank "signs" a purchase order of a credit card holder that it serves and submits it to the merchant, the bank may want to limit its authorization of the credit card to a set amount to prevent any overcharging of the account.

Thus, there is a need to provide an enhanced digital signature that allows a purpose to be bound to digital signatures so that signatures cannot be employed for an improper purpose or abused.

SUMMARY

The invention is a method and apparatus for encoding a purpose description into a digital signature. Purpose description encoding allows an entity during an electronic transaction to control and enforce the purpose authorized for a digital signature.

An input data stream is passed through a hash function and utilized to generate a first hash value. The first hash value is used as a seed in generating an extended digital signature which amalgamates the purpose description into an ordinary digital signature. A purpose description is passed through a hash function (computer program/code which executes hashing), seeding with the first hash value to generate an extended hash value. The extended hash value is passed to a digital signature function (computer program/code which generates a digital signature) to generate an extended digital signature. The digital signature function can generate a digital signature which may be affixed to a transaction or document. When the extended digital signature is provided along with the purpose description to another digital signature function, generated by a different process or computer, both digital signature and purpose description can be decrypted to verify their authenticity. The extended digital signature capability and/or verification can be implemented as a service for function calls from other computers or processes, each function call passing its own digital signatures and purpose descriptions.

In an electronic transaction, a client may send purchasing data to a server which produces an extended digital signature. The extended digital signature can be sent to a second server or process to verify that the signature and purpose are valid. A key feature is that the purpose description is bound together with the digital signature such that it cannot be separated and tampered with.

In a computer or data processing system, extended digital signature capability is implemented using a digital signature processor which can act together with a CPU and memory. The digital signature processor includes a hash function circuit and a digital signature circuit and can also include a signature and purpose verification circuit. The purpose description encoding safeguards the misuse and abuse of digital signatures.

DETAILED DESCRIPTION OF THE INVENTION

Figure 1:
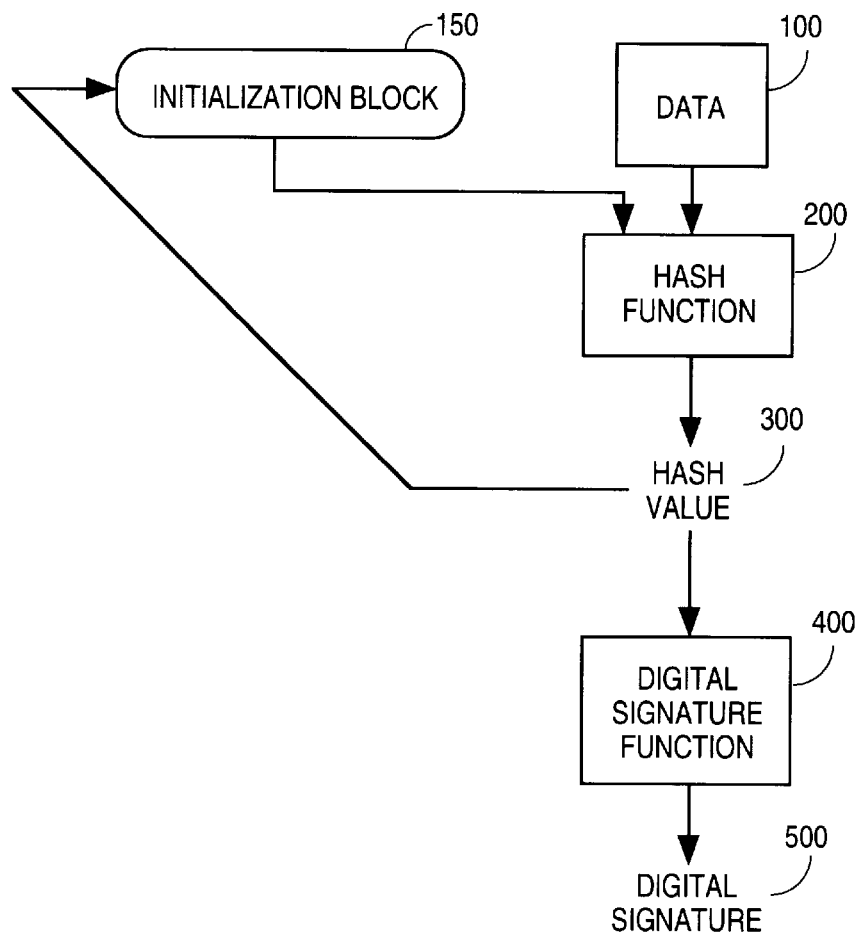
FIG. 1 is a diagram of ordinary digital signature generation without purpose binding.

FIG. 1 is a diagram of ordinary digital signature generation without purpose binding.

As shown in FIG. 1, the first step in generating a digital signature is to pass data to be signed through a hash function. A hash function takes any arbitrary length input data stream and converts it to a fixed length (generally smaller than the input data length) output data, also known as a hash value. FIG. 1 shows that data 100 passes through hash function 200 to produce an output hash value 300. Hash function 200 may be any hash function such as the Message Digest 5 (MD5) or Secure Hash Algorithm-1 (SHA-1), which are well-known in the art. Next, hash value 300 is passed to Digital Signature Function 400 which uses hash value 300 to create a digital signature 500. Digital Signature Function 400 may use any cryptographic algorithm such as the Rivest, Shamir, and Adleman (RSA) algorithm or the Digital Signature Algorithm (DSA), which are well-known in the art.

Hash functions, such as MD5 and SHA-1 transform an input value (typically 512 bits in length) into an output hash value of fixed size (128 bits for MD5 and 160 bits for SHA). The next 512-bit segment of input data is used with the output hash value of the previous segment as the input value to create another hash value. This process iterates until a final hash value is obtained which accounts for the entire data stream. An initialization block 150 is used to seed the process for the first input block. To express this operation, assume that $V_i$ represents a hash value at each iteration i, where i is an integer and assume $P_i$ represents a 512-bit segment of the data stream, with i a non-zero positive integer, and H (x,y) a hash function with initialization x and an input data segment y. Then, FIG. 1 hashing operation can be represented as $V_i=H(V_i-1, P_i)$ (when i=1 a starting initialization block Vo can be prespecified). The final hash value V will represent a hash of all data in the data stream, and will be either 128 bits (MD5) or 160 bits (SHA-1) and passed to the digital signature function. Advantageously, this feature of certain hash functions being capable of iterative processing of input data is utilized in purpose binding according to various embodiments of the invention.

Since any hash function may be used in accordance with various embodiments of the invention, and since hash functions are well-known in the art, no detailed description of the operation of hashing will be provided.

Figure 2:
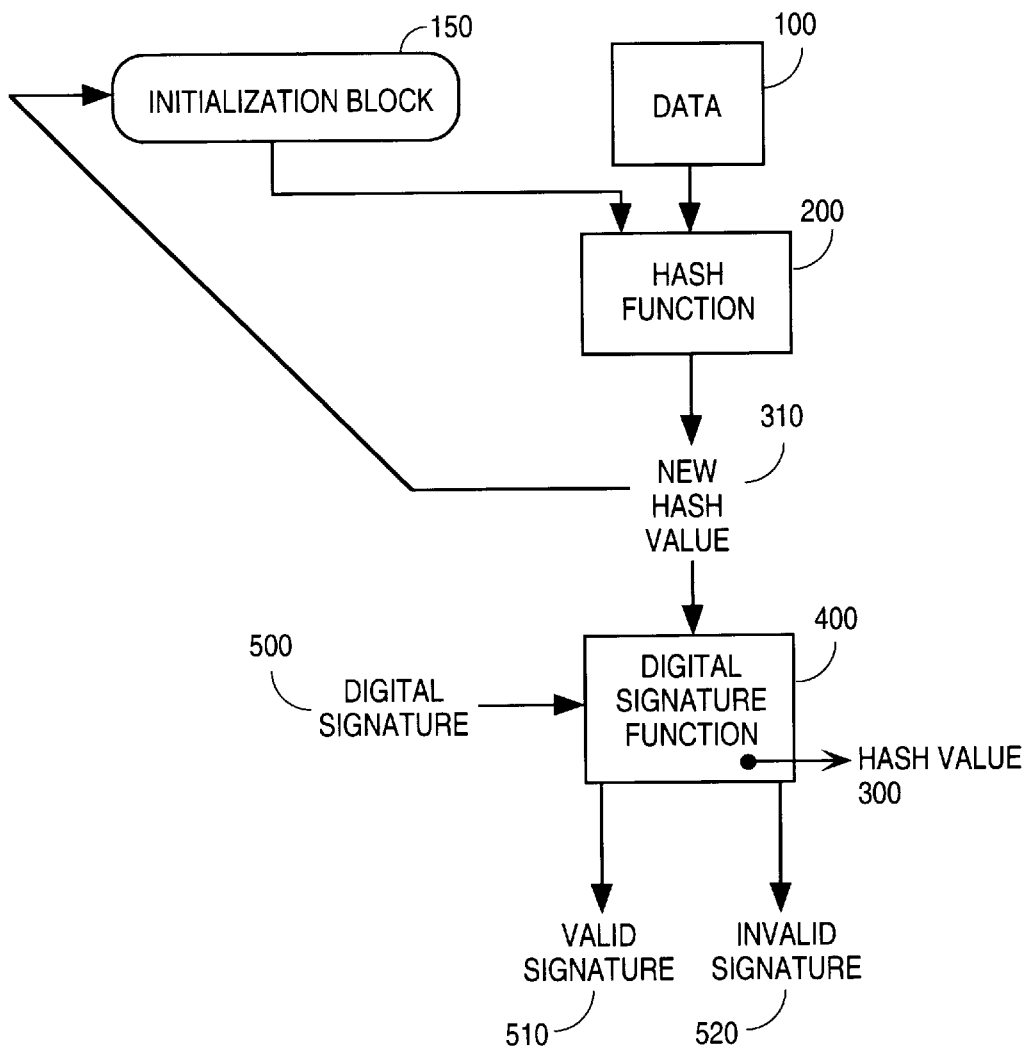
FIG. 2 is a diagram of typical digital signature verification without purpose binding.

FIG. 2 is a diagram of ordinary digital signature verification without purpose binding. The first step in verifying a digital signature is to pass the data 100 to be verified through a hash function 200 to generate new hash value 310. Initialization block 150 operates identically as described with respect to FIG. 1 in providing an initial seed for the first segment of data and using intermediary hash values in succeeding segments. New hash value 310 and digital signature 500 are passed to the digital signature function 400. Digital signature function 400 decrypts digital signature 500 with the public key of the originator and recovers hash value 300 of FIG. 1. Hash value 300 is then compared to new hash value 310. If hash value 300 matches new hash value 310, then digital signature 500 is valid (510). If hash value 300 does not match new hash value 310, then the digital signature 500 is invalid (520).

Any public-key cryptography algorithm may be used in the digital signature function according to various embodiments of the invention, but for purposes of illustration, RSA is described since it is ideally suited to digital signature functions. Public keys and private keys in RSA public-key cryptography are functions of a pair of large (over a 100 digit) prime numbers. To generate the keys, choose a p and q of equal length as random large prime numbers. The product n=p*q is a modulus and e, another randomly chosen prime number, is the public exponent. The modulus and public exponent (n,e) represent the public key. To encrypt a message, such as a signature S, partition the message into k blocks, each smaller than n in magnitude. For example, if p and q are 100 digit prime numbers, n will be less than 200 digits and each data block $S_i$ should be also less than 200 digits. The encrypted message will be evaluated as $C=S_i^e$ mod n, where mod is the modulus function.

A private exponent d will have the relation $d=e^{-1}$ ((p-1) (q-1)), wherein (p-1) and (q-1) are also prime. The modulus and the private exponent (n,d) represent the private key. Thus, to decrypt the signature, the expression $S=C_i^d$ mod n is evaluated.

Figure 3:
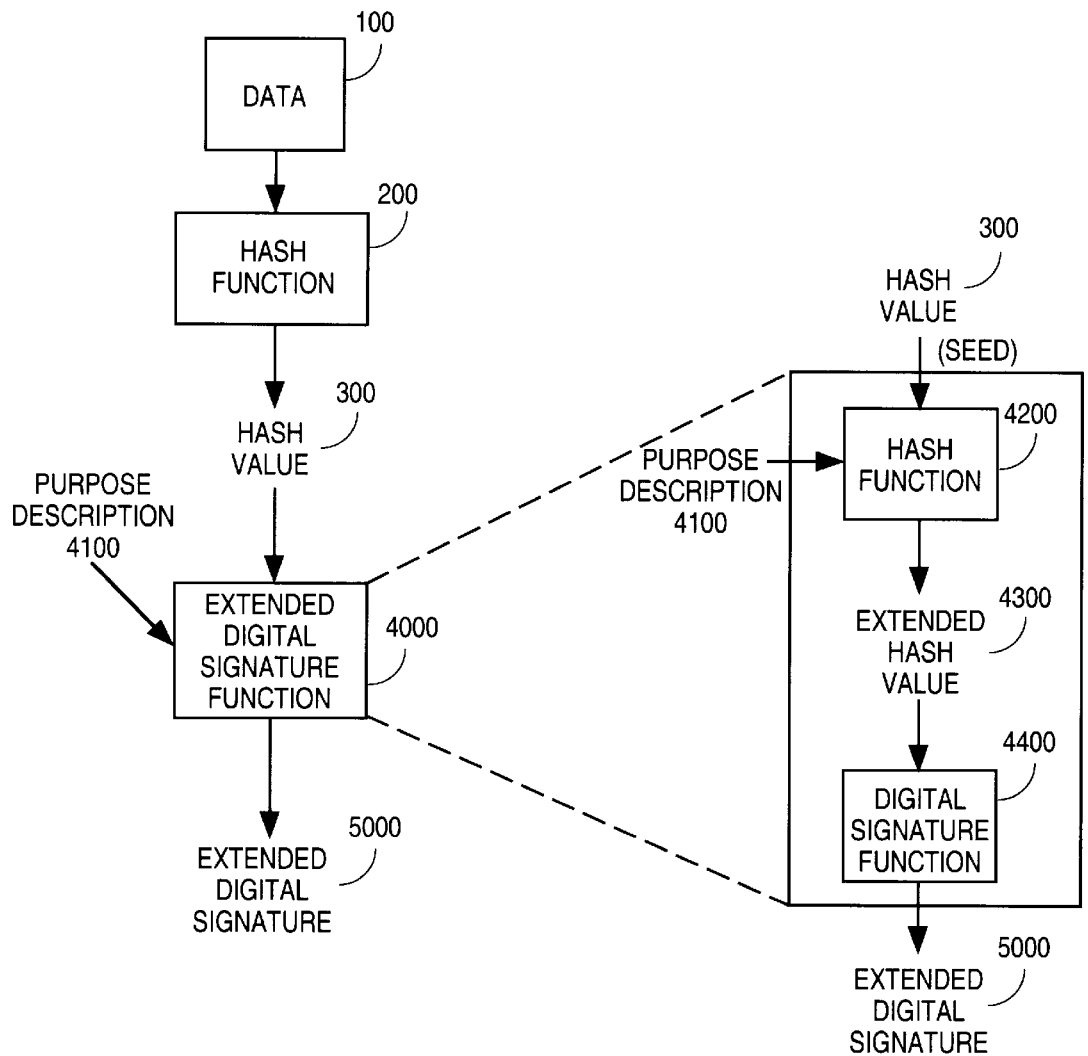
FIG. 3 is a diagram of extended digital signature generation with purpose binding according to one embodiment of the invention.

FIG. 3 is a diagram of ordinary digital signature generation with purpose binding according to one embodiment of the invention.

In FIG. 3, as in FIG. 1, an input data 100 is passed (iteratively or otherwise) through hash function 200 to produce hash value 300. Though FIG. 3 does not illustrate the iterative nature of a hash function as it computes the hash value according to data 100, it should be understood that the elements of FIG. 1 and the description thereof showing the iterative nature of hashing can be substituted without changing or obscuring the invention.

Once a hash value 300 is computed using data 100, the hash value 300 is used in extended digital signature function 4000 to produce a extended digital signature 5000. Extended digital signature 5000 is an amalgam of an ordinary digital signature along with a purpose description. Extended digital signature function 4000 contains, therefore, not only an ordinary digital signature function 4400, which behaves like digital signature function 400 of FIG. 1, but also a hash function 4200 to include a purpose description in the digital signature.

Within extended digital signature function 4000, hash value 300 is passed to hash function 4200—which may be the same or different hash function as hash function 200—as an initialization block (seed) similar to initialization block 150 of FIG. 1. A purpose description 4100, such as a legal disclaimer or "amount not-to-be exceeded" statement, is passed to hash function 4200 as the data stream input. Using an initialization hash value 300 and purpose description 4100, hash function 4200 generates an extended hash value 4300. Extended hash value 4300 is the original hash value 300 bound together with purpose description 4100. Extended hash value 4300 is passed to digital signature function 4400, which behaves similar to digital signature function 400 of FIG. 1. Finally, extended digital signature 5000 is generated from digital signature function 4400 using extended hash value 4300. Thus, using the procedure outlined above, as shown in FIG. 4, an extended digital signature capability (EDSC) can provide other systems, processes or functions the ability to binding purpose to digital signatures in their operations.

Figure 4:
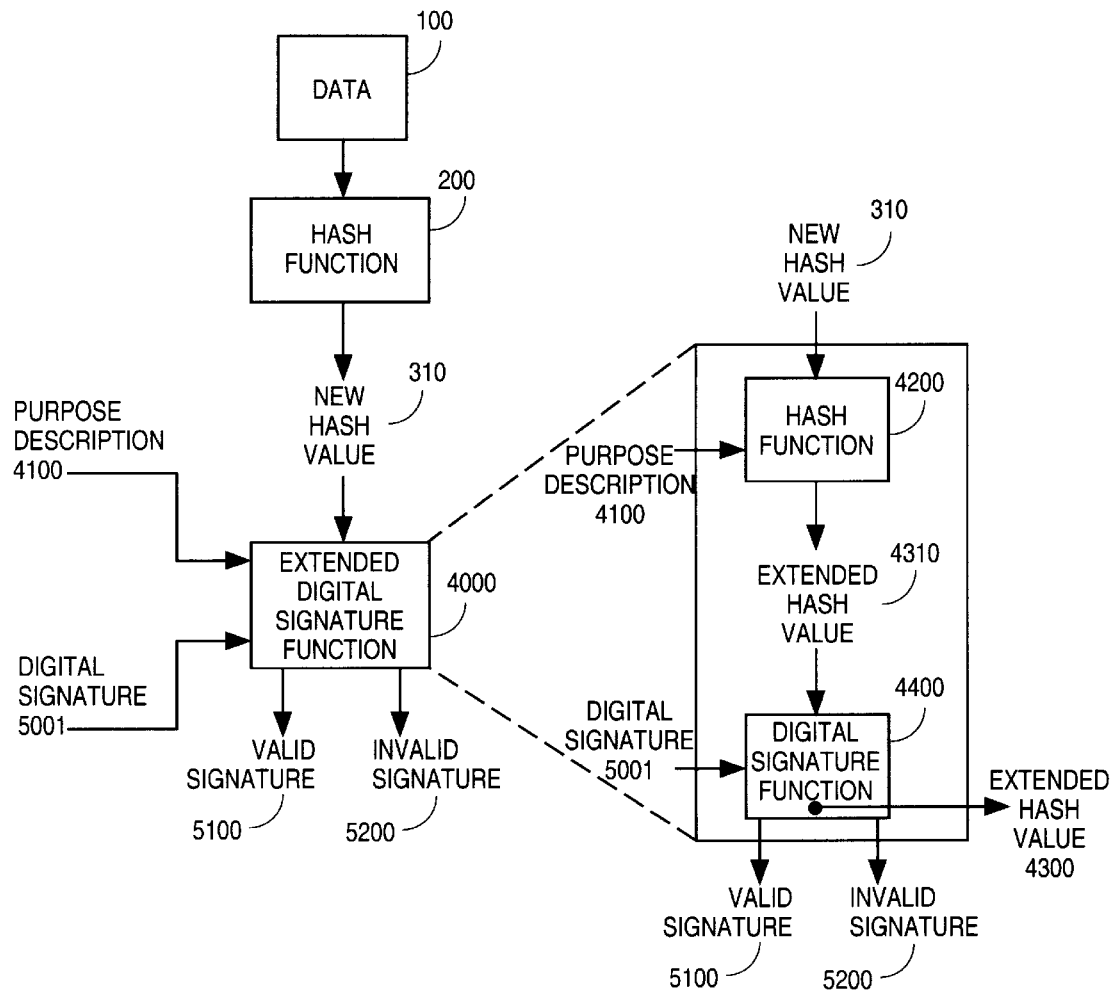
FIG. 4 is a diagram of digital signature verification with purpose binding according to one embodiment of the invention.

FIG. 4 is a diagram of digital signature verification with purpose binding according to one embodiment of the invention. In FIG. 4, as in FIG. 2, the first step in verifying a digital signature is to pass the data 100 to be verified through a hash function 200 to generate new hash value 310. Once it is computed, new hash value 310, purpose description 4100, and digital signature 5001 are passed to extended digital signature function 4000.

Within extended digital signature function 4000, hash value 310 is passed to hash function 4200 as an initialization block similar to initialization block 150 described for FIG. 2. Purpose description 4100 is used as the data stream input into hash function 4200. Using these values, hash function

4200 generates an extended hash value 4310. Extended hash value 4310 and digital signature 5001 are then passed to digital signature function 4400, which behaves similar to digital signature function 400 of FIG. 2.

Digital signature function 4400 decrypts digital signature 5001 with the public key of the originator and recovers extended hash value 4300. Extended hash value 4300 is then compared to extended hash value 4310. If extended hash value 4300 matches extended hash value 4310, the digital signature 5001 is valid (5100). If extended hash value 4300 does not match extended hash value 4310, the digital signature 5001 is invalid (5200).

Figure 5:
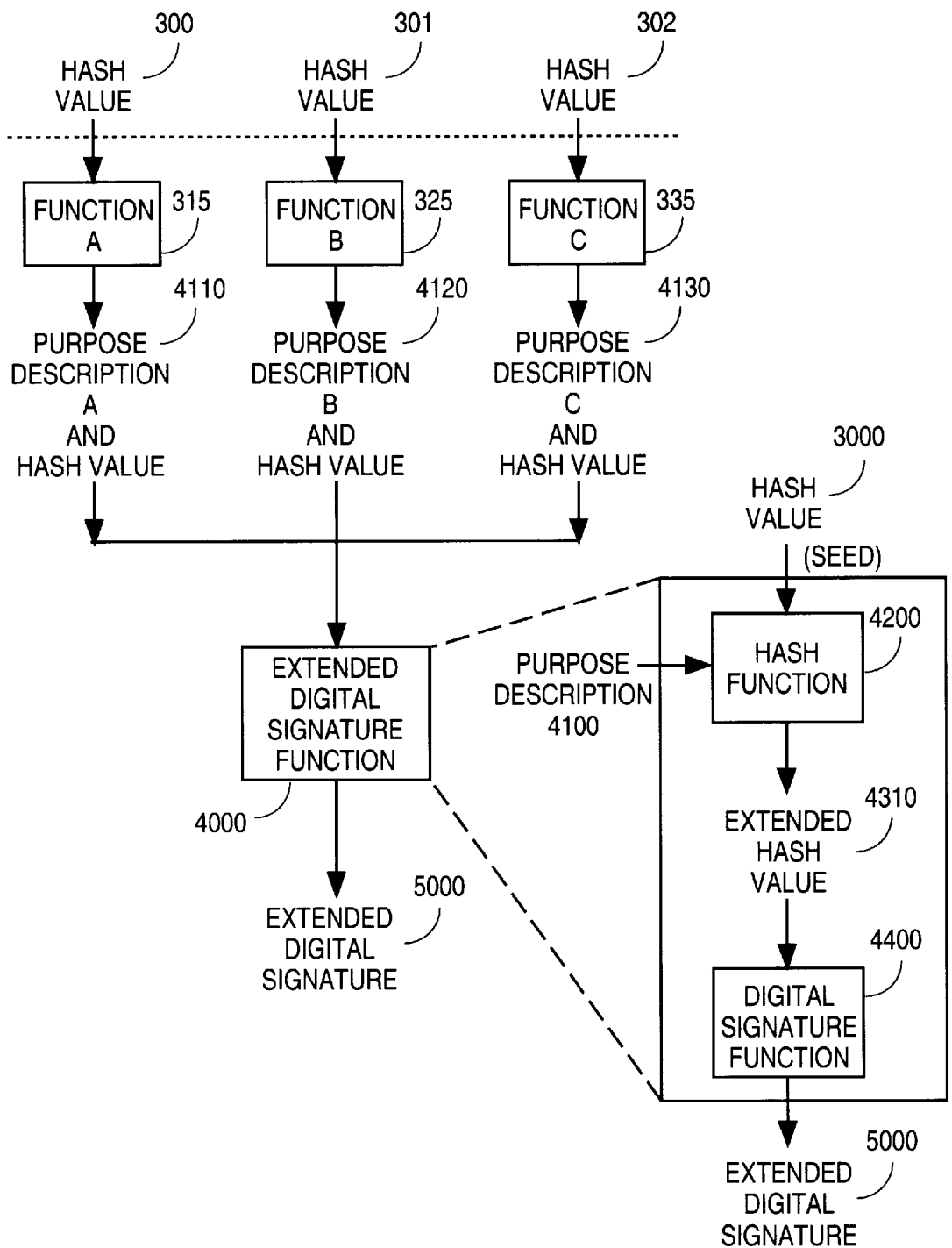
FIG. 5 is a diagram of extended digital signature generation with purpose binding according to another embodiment of the invention.

FIG. 5 shows the implementation of digital signature generation with purpose binding in an actual security system. All components not described below operate like their counterparts in FIG. 3, described above.

Hash values 300, 301 and 302, generated by executing a hash function on different data, are used by three different functions or processes which require digital signature generation. Function A 315, Function B 325 and Function C 335 are separate function calls, each with its own purpose description, namely, Purpose Description A 4110, Purpose Description B 4120, and Purpose Description C 4130, respectively. These independent functions or applications are serviced by the EDSC (extended digital signature capability), described above. A function call may originate within the same computer running the extended digital signature capability or within a computer networked to the computer running the extended digital signature capability.

The input hash value of each function call, Function A 315, Function B 325 or Function C 335 is separately passed to the EDSC to generate three separate digital signatures. For instance, if Function A 315 calls the EDSC to generate a digital signature, then Purpose Description 4100 would equal Purpose Description A 4110 and hash value 3000 would equal hash value 300, and thus, the digital signature generated would be specific to Function A 315 and include Purpose Description A 4110 within extended hash value 4300 and consequently, within the extended digital signature 5000.

Thus, rather than an originator processing its own digital signature and purpose, the originator can request a digital signature generation service through an appropriate function call with the function call passing purpose description for that function. Then the EDSC will bind the purpose passed to it and thus, provide a digital signature generation service capable of purpose binding. In such an arrangement, the originator does not know of the purpose binding except by reference based on the function call (e.g., calling Function B 325 would result in Purpose Description B 4120 being bound). In order to prevent circumvention and tampering, the function call will directly pass the purpose description to the EDSC, along with the hash value of the originator.

Figure 6:
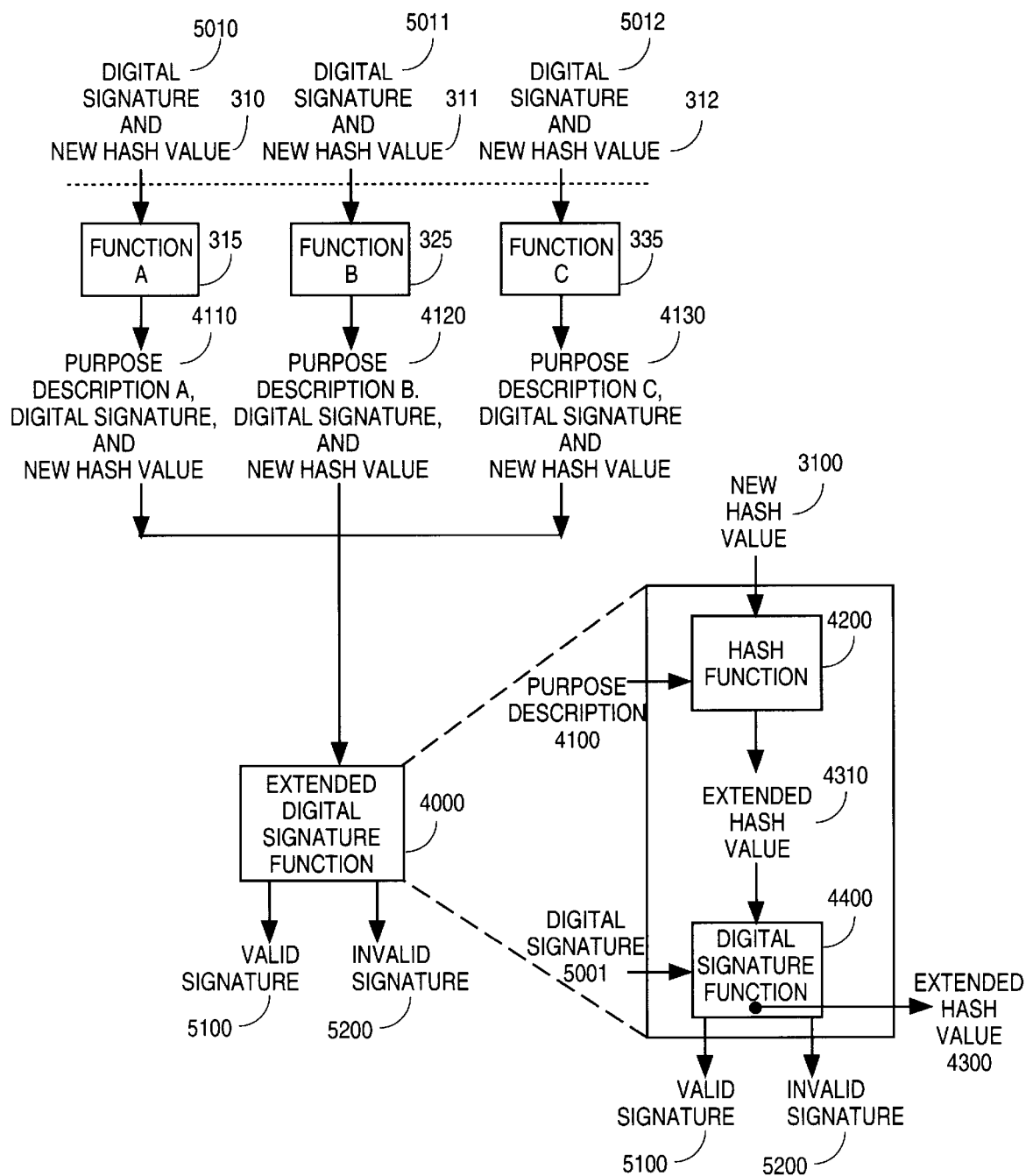
FIG. 6 shows the implementation of digital signature verification with purpose binding according to another embodiment of the invention.

FIG. 6 shows the implementation of digital signature verification according to one embodiment of the invention. All components not described below operate like their counterparts in FIG. 4, described above. Digital signatures 5010, 5011, and 5012 and hash values 310, 311, and 312 generated on different data by digital signature generation and hash functions are used by three different "functions" or processes which require digital signature verification. Function A 315, Function B 325, and Function C 335 are separate function calls or processes, each with their own purpose description, namely, Purpose Description A 4110, Purpose Description B 4120, and Purpose Description C 4130, respectively. These independent functions or processes are serviced by the EDSC (extended digital signature capability) described above. A function call may originate within the same computer running the extended digital signature capability or within a computer networked to the computer running the extended digital signature capability.

The input digital signature and hash value of each function call, Function A 315, Function B 325, and Function C 335, are separately passed through the extended digital signature function to verify three separate digital signatures. For instance, if Function A 315 calls upon the EDSC to verify a digital signature, then purpose description 4100 would equal Purpose Description A 4110, and digital signature 5001 would equal digital signature 5010, and new hash value 3100 would equal new hash value 310. Thus the digital signature verified would be specific to Function A 315 and include purpose description A 4110 within extended hash value 4310. Extended hash value 4310 would then be compared with the extended hash value 4300 recovered by digital signature function 4400 for verification (5100—valid and 5200—invalid).

Thus, the originator can request a digital signature verification service through an appropriate function call and the function call will pass the purpose description for that function. Then the EDSC will verify that the purpose passed to it either does or does not match the one contained in the digital signature and thus, provide a digital signature verification service capable of validating purpose binding. In such an arrangement, the originator is not aware of the purpose binding except perhaps by reference based on the function call. In order to prevent circumvention and tampering, the function call will directly pass the purpose description to the EDSC, along with the digital signature and hash value of the originator.

Figure 7:
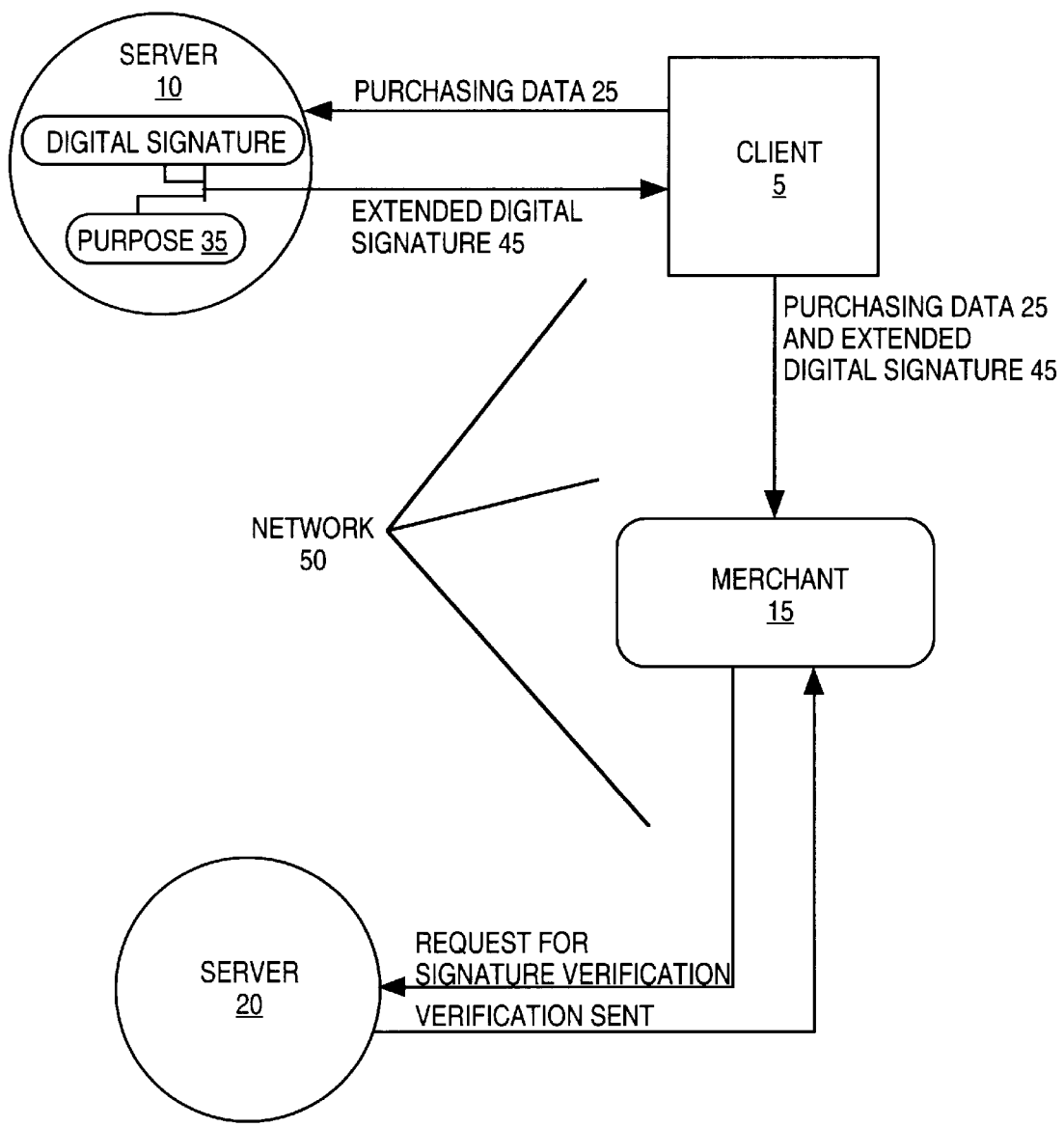
FIG. 7 is a diagram of an electronic transaction in a network using extended digital signatures with purpose binding according to the invention.

FIG. 7 is a diagram of an electronic transaction in a network using extended digital signatures with purpose binding according to the invention.

Server 10 is shown capable of receiving and sending data over some form of network or communications interface 50 (such as LAN or the Internet) to a client 5. Client 5, in an electronic commerce setting, may be a purchaser/customer attempting to transact with a merchant 15. Merchant 15 is also connected over network 50 to receive from and send data to server 10, client 5 and also a server 20. In the electronic commerce context, server 20 may be a service which verifies signatures submitted to them while server 10 may be the bank issuing credit or authorizing release of the funds of a purchaser held in an account at that bank.

If client 5 wishes to purchase or order a product or service from merchant 15, it would submit to its bank, server 10, purchasing data 25 identifying the product/service desired, the account number of the purchaser with the bank and the price the purchaser should pay. This purchasing data 25 may be sent over some secure transmission protocol so that the data relating to account information cannot be intercepted and/or misappropriated while being transmitted over network 50. Server 10 receives purchasing data 25 and affixes a signature to the data along with a purpose description which limits or qualifies the authorization represented by the signature.

In one embodiment, the digital signature is generated by server 10 itself and then forwarded directly to merchant 15 for processing the order. In another embodiment, the signature or authorization and purpose may be wrapped as a function call to an application program interface on client 5, and therefore the purpose 35 (with or without data 25) is sent back to client 5. In this embodiment, an application program interface of client 5 provides an extended digital signature functionality in hardware or software which will bind the purpose 35 with the digital signature amalgamating them with purchasing data 25.

Once the extended digital signature 45 (a combination of purpose and signature) is generated, as described for FIGS. 3 and 5, it is sent along with the purchasing data 25 to merchant 15 so that merchant 15 can process the order. Merchant 15, upon receiving digital signature 45, may wait to process the order from purchasing data 25 until the signature can be verified. Thus, merchant 15 will typically send the extended digital signature 45 to a signature verification service such as server 20 and await for server 20 to return a message stating that the signature is valid. This is performed as part of the signature verification process described in FIGS. 4 and 6.

In an alternate embodiment, merchant 15 will be able, using an internal application program interface, to verify the signature locally. Once the signature is verified as valid and authentic, and provided purpose 35 is not violated by purchasing data 25, such as the price exceeding the available credit of the customer with the bank, merchant 15 processes the order according to the purchasing data 25 sent it.

Figure 8:
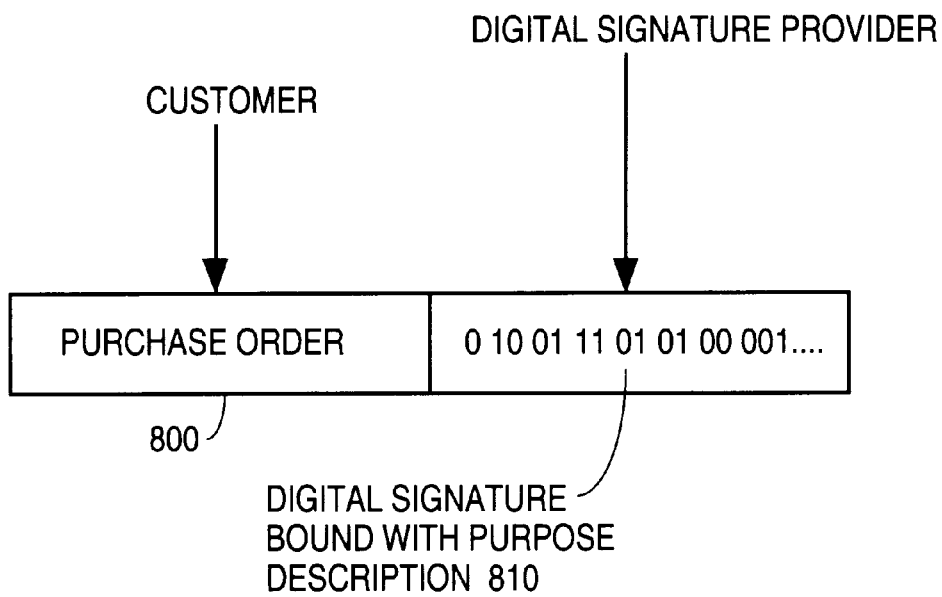
FIG. 8 shows different ways of affixing purpose in an electronic transaction.

FIG. 8 shows the format of data with a signature and digital purpose. FIG. 8 illustrates a purchase order 800 affixed with a digital signature bound with purpose description 810 which can be used in an electronic transaction. A customer can provide the purchase order 800 to which a digital signature provider may affix digital signature bound with purpose description 810.

Since the purpose is bound within the digital signature, it cannot be peeled off separately and manipulated. Wherever the signature goes, the purpose travels with it. Only the data section of the entire message is known to the customer or purchaser. The provider of the digital signature controls and can enforce the purpose for which the digital signature was affixed. Thus, limited warranties, disclaimers of liability, credit limits and other qualifications can be placed on a digital signature. If the purpose was detached and separated from the digital signature as a separate attachment, tampering is made easier. The customer/client in that case requesting the signature could detach the purpose description or modify it to their liking. Also, if the purpose was instead attached as part of the data, then there would be no authenticity to the signature/purpose. In this case, the client/customer can affix his own purpose description to the data and circumvent the ability of the signatory to provide a purpose. Thus, by binding the purpose to the digital signature, as shown in FIG. 8, it is in the sole control of the signatory and not others, such as the merchant or customer.

Figure 9:
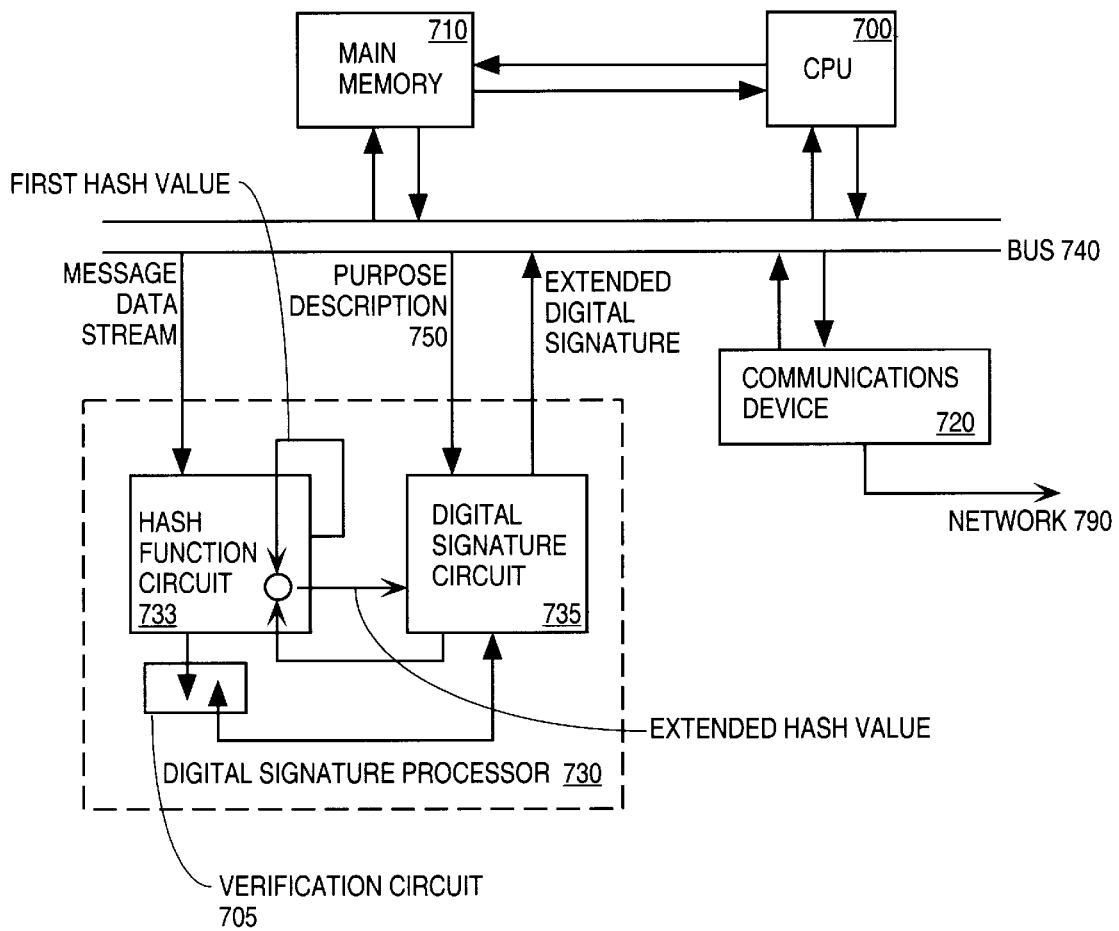
FIG. 9 shows a processor embodiment of extended digital signature generation with purpose binding.

FIG. 9 shows a processor embodiment of extended digital signature generation with purpose binding.

A main memory 710 communicates with a CPU (Central Processing Unit) 700 directly and through a bus 740. Main memory 710 may be DRAM (Dynamic Random Access Memory) or SRAM (Static Random Access Memory), while CPU 700 may be a microprocessor such as the Intel Pentium™ microprocessor and associated components. Bus 740 is the main system bus and may be a Peripheral Component Interconnect (PCI) bus, for example. CPU 740 executes code and main memory 710 is capable of storing data or code and interacting with CPU 740 to execute code operations.

Implemented as hardware, such as in a VLSI (Very Large Scale Integrated Circuit) chip, a digital signature processor 730 according to an embodiment of the invention is shown in FIG. 7 as coupled to bus 740.

Digital signature processor 730 is coupled to or contains two circuits—hash function circuit 733 and digital signature circuit 735. Hash function circuit 733 receives a data stream over bus 740 from main memory 710 (or other component) which it uses along with a pre-specified initialization block to hash the data stream by segmenting it in main memory 710 as needed to produce a first hash value. Hash function circuit 733 cooperates with CPU 700 to perform this computation to arrive at the hash value. The hash value is fed back into hash function circuit 733 along with a purpose description 750 to compute a new, extended hash value. The extended hash value is passed to the digital signature function circuit to produce an extended digital signature. Though the digital signature processor is shown as a separate processor residing off the bus, it may be implemented as an embedded processor within the CPU or as plug-in module (e.g., SRAM or Flash).

Also shown is a communications device 720, such as a modem, which can receive the data stream and the extended digital signature and transmit them to other computer systems through some network 790. The function of verifying the digital signature (bound with or without purpose) can be executed by a verification circuit within digital signature processor 730. Verification circuit 705 is capable of interfacing with hash function circuit 733 and, though not directly shown, digital signature circuit 735 and may also interface with CPU 700 and main memory 710 through bus 740 to carry out verification. The state of validity and authenticity for a signature can be transmitted over network 790 to other computers via communications device 720.

It should be noted that the words "purpose" and "purpose description" are interchangeable in meaning and have been so used in describing the invention and the embodiments thereof. Further, the hash functions, digital signature functions and extended digital signature capability may be implemented as software, i.e. computer program code, which can execute the methodology of the invention and its various embodiments.

While the invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method for encoding a purpose description for a data stream comprising the steps of:

passing a purpose description to an extended digital signature function;

seeding a first hash function with a hash value generated from said data stream;

passing said purpose description to said hash function;

generating an extended hash value from said purpose description and said first hash value; and generating an extended digital signature using a digital signature function on said extended hash value.

2. A method of verifying a digital signature and a purpose description for a data stream comprising the steps of:

passing said purpose description and said digital signature to an extended digital signature function;

generating a first extended hash value using said purpose description;

recovering a second extended hash value from said digital signature; and comparing said first extended hash value with said second extended hash value, a true comparison resulting in verifying that digital signature and said purpose description are valid.

3. A method of verifying according to claim 2 further wherein the step of generating said first extended hash value includes the step of:

passing an initialization block and said purpose description to a first hash function, said first hash function generating said first extended hash value.

4. A method of verifying according to claim 3 further comprising the steps of:

passing said data stream to a second hash function generating an initialization hash value, said initialization hash value used as said initialization block.

5. A method of verifying according to claim 2 wherein the step of recovering said second extended hash value includes the step of:

decrypting said digital signature to recover said second extended hash value.

6. A method of verifying according to claim 2 wherein said digital signature and said purpose description are used in performing an electronic transaction.

7. A method of verifying according to claim 6 wherein said electronic transaction is performed in accordance with purpose description which verified as valid.

8. A method for encoding a purpose description for a digital signature of a data stream in an electronic transaction, comprising the steps of:

generating a hash value using a hash function on said data stream;

passing said hash value and said purpose description to said hash function to generate an extended hash value;

generating said extended digital signature by passing said extended hash value to a digital signature function wherein said digital signature function binds said purpose description with said digital signature; and affixing said extended digital signature to said input data stream to perform said electronic transaction.

9. A method according to claim 8 wherein said electronic transaction is performed only in accordance with said purpose description, if said purpose description is verified as valid.

10. In a network capable of handling an electronic transaction, an apparatus comprising:

a client coupled to said network requesting said electronic transaction, said client sending a request over said network;

a server coupled to said client, and to said network, said server receiving said request and sending an extended digital signature for authorizing said request, wherein a purpose description is binded in said extended digital signature; and an electronic transaction provider, said provider coupled to said network, said provider completing said electronic transaction in accordance with said purpose description of said authorization.

11. An apparatus according to claim 10 wherein said provider cannot complete said electronic transaction until said extended digital signature is verified as valid.

12. In a computer system having main memory, CPU, and bus, a digital signature processor comprising:

a hash function circuit coupled to said bus receiving input data signals over said bus and converting said input data signals to a hash value;

a digital signature circuit coupled to said hash function circuit to receive said hash value and a purpose description stored in said computer system and to bind said purpose description and said hash value into an extended digital signature.

13. A digital signature processor according to claim 12, further comprising a digital signature verification circuit, said digital signature verification circuit comparing said hash value with a second value, wherein if said comparison evaluates true, said digital signature is verified as valid.

14. A digital signature processor according to claim 12, wherein said digital signature processor is embedded in said CPU.

* * * * *